United States Patent
Strashny (10) Patent No.: US 11,121,550 B2
(45) Date of Patent: Sep. 14, 2021

(54) POWER DISTRIBUTION SYSTEM FOR A MARINE VESSEL

(71) Applicant: CATERPILLAR INC., Deerfield, IL (US)

(72) Inventor: Igor Strashny, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 31 days.

(21) Appl. No.: 16/404,427

(22) Filed: May 6, 2019

(65) Prior Publication Data
US 2019/0359307 A1 Nov. 28, 2019

(30) Foreign Application Priority Data

May 24, 2018 (GB) ..................................... 1808521

(51) Int. Cl.
| | | |
|---|---|---|
| *B63H 21/17* | (2006.01) | |
| *H02J 3/00* | (2006.01) | |
| *B63H 23/24* | (2006.01) | |
| *H02J 4/00* | (2006.01) | |
| *H02J 9/06* | (2006.01) | |

(Continued)

(52) U.S. Cl.
CPC .............. *H02J 3/007* (2020.01); *B60L 1/003* (2013.01); *B63H 21/17* (2013.01); *B63H 23/22* (2013.01); *B63H 23/24* (2013.01); *H02J 4/00* (2013.01); *H02J 9/061* (2013.01); *H02J 9/062* (2013.01);
(Continued)

(58) Field of Classification Search
CPC .. H02J 3/007; H02J 9/062; H02J 9/061; H02J 4/00; H02J 2310/42; B63H 21/17; B63H 23/22; B63H 23/24; B63H 25/42; B63H 21/21; B63H 2021/202; B60L 1/003; B60L 2200/32
See application file for complete search history.

(56) References Cited

U.S. PATENT DOCUMENTS

| | | | | |
|---|---|---|---|---|
| 6,592,412 B1 * | 7/2003 | Geil | ........................ | B63H 21/22 440/6 |
| 7,121,905 B2 * | 10/2006 | Rzadki | ...................... | H02J 4/00 440/3 |

(Continued)

FOREIGN PATENT DOCUMENTS

| | | |
|---|---|---|
| EP | 3046206 A1 | 7/2016 |
| GB | 2445382 A | 7/2008 |
| GB | 2547706 A | 8/2017 |

OTHER PUBLICATIONS

Search Report for related United Kingdom Application No. 1808521.7; dated Nov. 23, 2018.
(Continued)

*Primary Examiner* — Thomas J. Hiltunen (57) ABSTRACT

The present disclosure is directed towards a power distribution system for a marine vessel. The power distribution system comprises auxiliary, first and second buses and first and second propulsors for propelling the marine vessel. A first power generation system is electrically connected to the first bus and operably connected to the first propulsor. A second power generation system is electrically connected to the second bus and operably connected to the second propulsor. The first and second buses are electrically connected to the auxiliary bus such that electrical power is transferable between the first and second power generation systems for driving the first and/or second propulsors.

20 Claims, 3 Drawing Sheets

(51) Int. Cl.
*B63H 23/22* (2006.01)
*B60L 1/00* (2006.01)
*B63H 25/42* (2006.01)

(52) U.S. Cl.
CPC ........... *B60L 2200/32* (2013.01); *B63H 25/42* (2013.01); *H02J 2310/42* (2020.01)

(56) References Cited

U.S. PATENT DOCUMENTS

| | | | | |
|---|---|---|---|---|
| 7,960,948 B2 * | 6/2011 | Saban | ................... | H02K 11/33 322/89 |
| 8,062,081 B2 * | 11/2011 | Barrett | ................... | B60K 5/08 440/1 |
| 8,926,381 B2 * | 1/2015 | Haugland | ................ | H02J 3/36 440/6 |
| 9,199,711 B2 * | 12/2015 | Hartig | ...................... | B63H 5/07 |
| 9,413,164 B2 | 8/2016 | Hoeven | | |
| 9,487,284 B2 * | 11/2016 | Crane | ........................ | B63J 3/04 |
| 9,628,010 B2 | 4/2017 | Clarke et al. | | |
| 10,608,427 B2 * | 3/2020 | Lindtjorn | ................ | B63H 23/24 |
| 2006/0108882 A1 * | 5/2006 | Michalko | ............... | H02K 7/003 310/83 |
| 2010/0283316 A1 | 11/2010 | Crane et al. | | |
| 2013/0270902 A1 * | 10/2013 | Andersen | ................ | B60R 16/03 307/9.1 |
| 2017/0373498 A1 * | 12/2017 | Haugan | ..................... | H02H 3/26 |
| 2019/0023369 A1 * | 1/2019 | Gjerpe | .................. | B60L 3/0092 |
| 2019/0118960 A1 * | 4/2019 | Izquierdo Gil | ........... | H02J 3/38 |
| 2020/0377186 A1 * | 12/2020 | Thompson | .............. | B60L 50/64 |

OTHER PUBLICATIONS

Viknash Shagar, et al., "Effect of Load Changes on Hybrid Shipboard Power Systems and Energy Storage as a Potential Solution: A Review", Australian Maritime College, University of Tasmania, Launceston TAS 7250, Australia; Published Aug. 28, 2017.

* cited by examiner

POWER DISTRIBUTION SYSTEM FOR A MARINE VESSEL

CROSS-REFERENCE TO RELATED APPLICATION

This application claims priority under 35 USC §119 and the Paris Convention to United Kingdom Patent Application No. 1808521.7 filed on May 24, 2018.

TECHNICAL FIELD

This disclosure is directed towards a power distribution system for a marine vessel. This disclosure is further directed towards a method of operating a power distribution system for a marine vessel.

BACKGROUND

A marine vessel may be required to maintain a constant position and/or course relative to a location, such as the sea bed, other vessels and the like, whilst the marine vessel performs work or other operations. For example, the marine vessel may be a platform supply vessel that needs to maintain a fixed position relative to an offshore oil or gas platform whilst equipment is transferred between them. In other examples, the marine vessel may be an offshore supply vessel, tug, platform supply vessel, transportation vessel, offshore platform, anchor handling vessel, drilling vessel, construction vessel or the like and may comprise one or more work tools for performing work, such as drills, subsea vessels, anchors, cranes and the like.

Such a marine vessel typically comprises a dynamic positioning system to operate its propulsion system to ensure that it accurately maintains the required position and/or course. However, the dynamic positioning system and propulsion system may require additional levels of redundancy to enable the marine vessel to maintain its position and/or course in the event of a failure of one or more components of the propulsion system. Marine vessels are typically classified according to the capability of the dynamic positioning system, including their levels of redundancy.

Electrical propulsion systems are often used to improve redundancy. U.S. Pat. No. B2-9,413,164 discloses a power distribution system for a dynamically positioned vessel. The system comprises a plurality of buses, including a first bus to which a load is connectable, connected in a ring by a plurality of switches, including a first switch and a second switch. The first bus is connected between the first switch and the second switch. In the case of failure at the first bus and/or load, the first switch and second switches are opened to disconnect the first bus from the ring while all other buses remain connected together. However, such a system does not provide redundancy in the event of total electrical failure and in the case of significant failures across several buses. Furthermore, in practice, such electrical systems relying on switches typically require expensive and high maintenance equipment to maintain power quality, such as isolation transformers and phase multiplication transformers.

SUMMARY

The present disclosure therefore provides a power distribution system for a marine vessel comprising: auxiliary, first and second buses; first and second propulsors for propelling the marine vessel; a first power generation system electrically connected to the first bus and operably connected to the first propulsor; and a second power generation system electrically connected to the second bus and operably connected to the second propulsor; wherein the first and second buses are electrically connected to the auxiliary bus such that electrical power is transferable between the first and second power generation systems for driving the first and/or second propulsors.

The power distribution system may be configured for dynamically positioning the marine vessel. The first propulsor may be located towards the stern of the marine vessel and/or the second propulsor may be located towards the bow of the marine vessel. The power distribution system may further comprise a control unit configured to operate the power distribution system to transfer electrical power between the first and second power generation systems for driving the first and/or second propulsors. The control unit may be configured to operate the first power generation system to supply electrical power to the first bus; operate the buses to transfer the electrical power from the first bus to an auxiliary bus and from the auxiliary bus to the second bus; and operate the second power generation system to receive the electrical power from the second bus and supply mechanical power to drive the second propulsor. The control unit may be configured to operate the second power generation system to supply electrical power to the second bus; operate the buses to transfer the electrical power from the second bus to an auxiliary bus and from the auxiliary bus to the first bus; and operate the first power generation system to receive the electrical power from the first bus and supply mechanical power to drive the first propulsor.

The present disclosure further provides a method of operating a power distribution system for a marine vessel comprising: first and second buses electrically connected to an auxiliary bus; first and second propulsors for propelling the marine vessel; a first power generation system electrically connected to the first bus and operably connected to the first propulsor; and a second power generation system electrically connected to the second bus and operably connected to the second propulsor; wherein the method comprises: operating the first and/or second power generation system to generate electrical power; transferring the generated electrical power from the first and/or second power generation system to the second and/or first power generation system via the auxiliary, first and second buses; and operating the second and/or first power generation system to receive the electrical power and supply mechanical power to drive the second and/or first propulsors.

The method may comprise determining whether to isolate at least one of the first power generation system and second power generation system from the first and/or second bus and isolating at least one of the first power generation system and second power generation system from the first and/or second bus, wherein the isolating comprises disconnecting the at least one switch between the first and/or second power generation system and the first and/or second bus. The method may comprise determining whether to operate the marine vessel in at least one mode, whether the at least one mode is selected from a stationary mode, a standby mode, low transit speed mode, a medium transit speed mode, a high transit speed mode, a low power dynamic positioning mode and a high power dynamic positioning mode. The method may comprise implementing at least one of such modes. In the stationary mode electrical power may be supplied from the auxiliary bus to at least one hotel bus. In the standby mode, which may be implemented subsequently to the stationary mode, electrical power may be supplied from the second power generation system to at least one hotel bus. In the low transit speed mode, which may be implemented subsequently to the standby mode, the second power generation system may supply electrical power to the first and/or second propulsor. In the medium transit speed mode, which may be implemented subsequently to the low transit speed mode, the first power generation system may supply mechanical power to the first propulsor. In the high transit speed mode, which may be implemented subsequently to the medium transit speed mode, the first and second power generation system may generate electrical and/or mechanical power and supply mechanical power to the first propulsor. In the low power dynamic positioning mode the second power generation system may generate electrical power for supplying to the first and/or second power generation system to supply mechanical power to the first and/or second propulsor. In a high power dynamic positioning mode, which may be implemented subsequent to the lower power dynamic positioning mode, the first and second power generation systems generate electrical power for supplying to the first and/or second power generation system to supply mechanical power to the first and/or second propulsor.

BRIEF DESCRIPTION OF THE DRAWINGS

By way of example only, embodiments of a power distribution system for a marine vessel and a method of operating a power distribution system for a marine vessel are now described with reference to, and as shown in, the accompanying drawings, in which.

DETAILED DESCRIPTION

The present disclosure is generally directed towards a power distribution system for a marine vessel for supplying hotel loads and for providing the propulsive power to propulsors for propelling the marine vessel through a body of water. The power distribution system may comprise a plurality of power units for generating power and a plurality of buses for transferring electrical power between the power units, hotel loads and propulsors. The power distribution system may comprise a power generation system including a power unit mechanically and/or electrically connected to a propulsor. The power generation system may be connected to a bus, which may be electrically isolatable from the rest of the power distribution system by disconnecting the bus from the rest of the power distribution system. The power distribution system may be particularly suitable for a dynamic positioning system and may comprise a plurality of levels of redundancy, thus enabling the achievement of the highest classification for the dynamic positioning system.

In the following description the term "operably connected" may be interpreted to mean that one component can drive another component mechanically and transfer mechanical power therewith, for example by using mechanical coupling means. The coupling means may comprise engaged gears, connected shafts, torque converters, clutches, transmissions and any other suitable means for transferring power mechanically.

In the following description the term "electrically connected" may be interpreted to mean that one component can transfer electrical power or distribute electrical energy to another component, for example via an electrical circuit or network. The electrical circuit or network may comprise switches, cables, electrical connections, inverters, rectifiers, cables, isolators, batteries, power control electronics and any other suitable means for transferring power electrically. Furthermore, the following embodiment is primarily an alternating current system, but, as will be apparent to the skilled person, the present invention may also be implemented as a direct current system.

Figure 1:
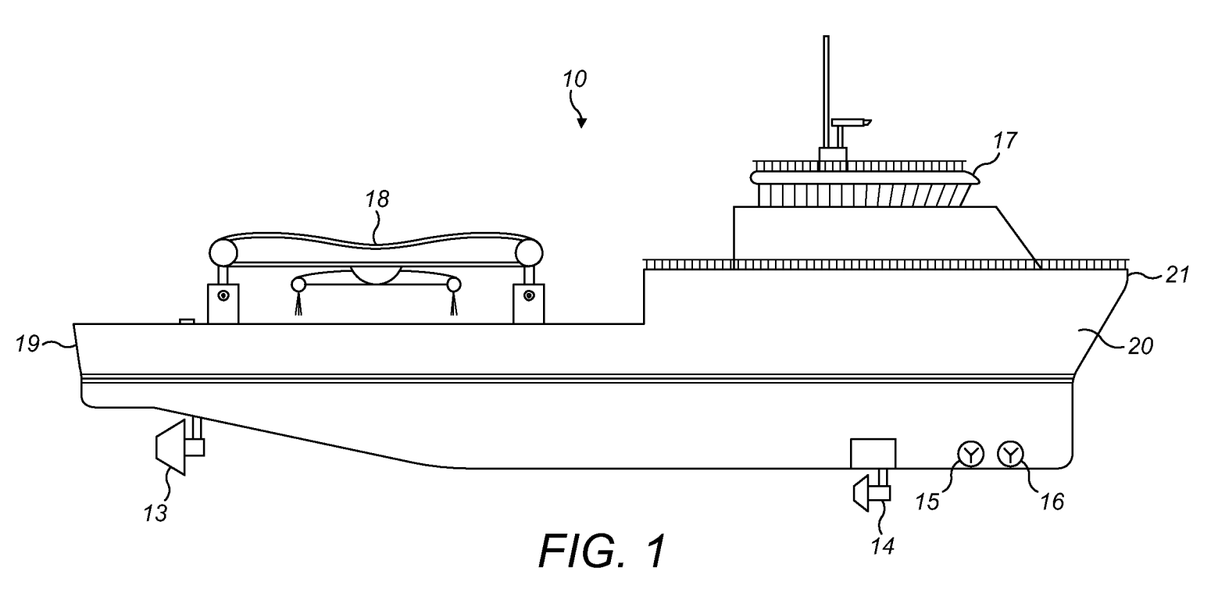
FIG. 1 is a side elevation of a marine vessel comprising the power distribution system of the present disclosure.
Figure 2:
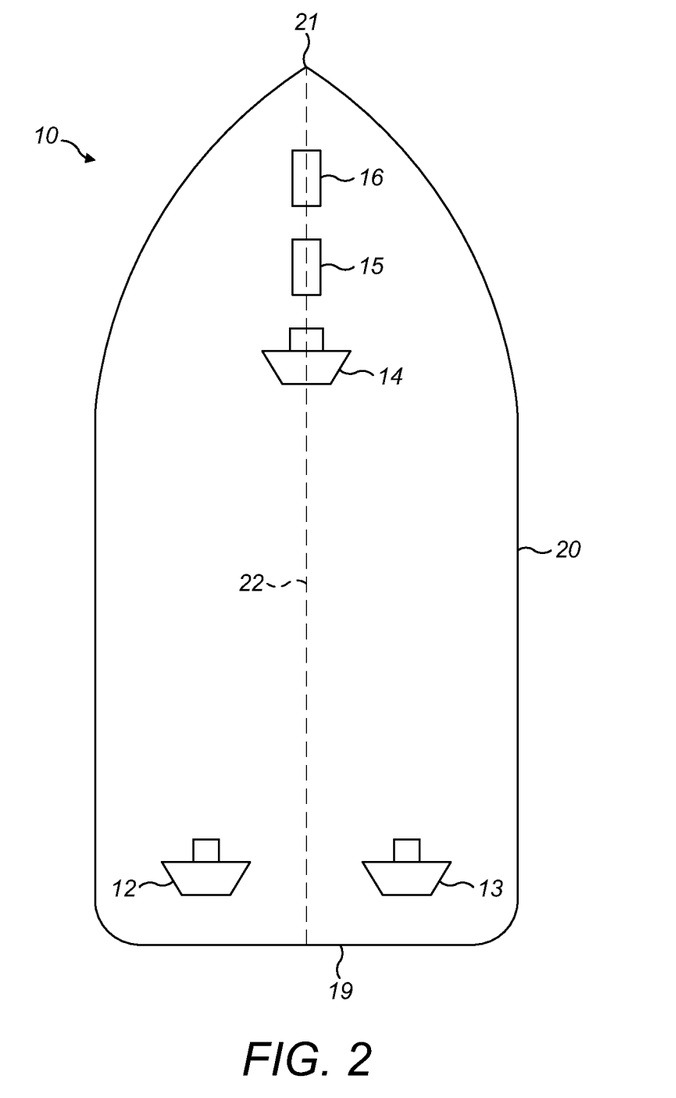
FIG. 2 is a schematic plan view of the marine vessel of FIG. 1.

FIGS. 1 and 2 illustrate an exemplary marine vessel 10, in this case an anchor handling tug supply vessel, comprising the power distribution system 11 of the present disclosure. The power distribution system 11, which is shown in further detail in FIG. 3, may be configured to distribute and provide electrical and mechanical power to components of the marine vessel 10. The power distribution system 11 comprises propulsors 12, 13, 14, 15, 16, including first and second propulsors 12, 14, for propelling the marine vessel 10 through a body of water. The power distribution system 11 may also provide the electrical power requirements of operator quarters 17, crane 18, the control unit and the like, which are commonly known as hotel loads.

The propulsors 12, 13, 14, 15, 16 may be configured for propelling the marine vessel 10 when it is in transit and travelling between distant locations and/or for propelling the marine vessel 10 during dynamic positioning and/or other short manoeuvres. As illustrated the propulsors 12, 13, 14, 15, 16 may comprise a first propulsor 12, and optionally a third propulsor 13, for providing main propulsive power when the marine vessel 10 is in transit. The first and/or third propulsor 12, 13 may be located at, adjacent to or towards the stern 19 of the marine vessel 10, for example by being located at a distance from the stern 19 of up to 25% or 50% of the length of the marine vessel 10. The first and/or third propulsor 12, 13 may be located on each of the port and starboard sides of the marine vessel 10. The at least one propulsor 12, 13, 14, 15, 16 may comprise a second propulsor 14, a first ancillary propulsor 15 and/or a second ancillary propulsor 16 for short manoeuvres. At least one of the second, first ancillary and second ancillary propulsors 14, 15, 16 may be located at, adjacent to or towards the bow 21 of the marine vessel 10, for example by being located at a distance from the bow 21 of up to 25% or 50% of the length of the marine vessel 10, and/or may be located substantially along a centreline 22 of the marine vessel 10 as illustrated.

The propulsors 12, 13, 14, 15, 16 may each comprise a propeller, an azimuth thruster, a multidirectional propeller, a tunnel thruster and/or a fixed propeller. In particular, as illustrated, the first, second and/or third propulsor 12, 13, 14 may comprise a multidirectional propeller, such as an azimuth thruster. At least the second propulsor 14 may be, as illustrated, retractable into a hull 20 of the marine vessel 10, such as when the marine vessel 10 is in transit. The first and/or second ancillary propulsor 15, 16 may comprise a tunnel thruster as illustrated.

Figure 3:
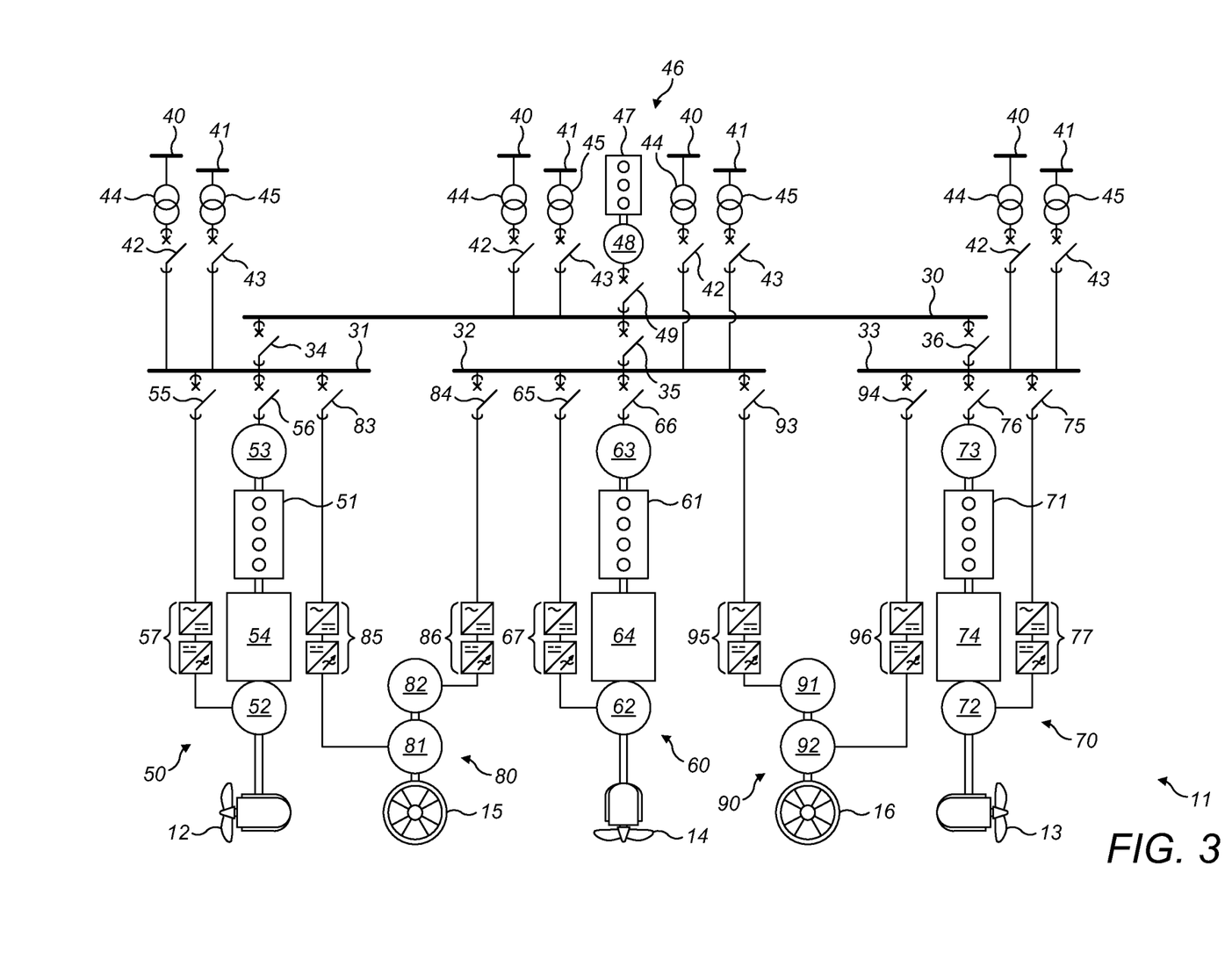
FIG. 3 is a schematic of a power distribution system of the present disclosure.

The power distribution system 11 comprises auxiliary, first and second buses 30, 31, 32 and may comprise a third bus 33, which may be selectively connectable such that electrical power can be exchanged therebetween. Each of the buses 30, 31, 32, 33 may be separate components and/or separate from one another. Each of the buses 30, 31, 32, 33 may be configured for distributing electrical power between the components connected to it. The auxiliary bus 30 and first bus 31 are electrically connected together, which may be selectively via a first bus switch 34. The auxiliary bus 30 and second bus 32 are electrically connected together, which may be selectively via a second bus switch 35. The auxiliary bus 30 and third bus 33 may be electrically connected together, which may be selectively via a third bus switch 36. The first, second and/or third bus switches 34, 35, 36 may be controlled by a control unit (not shown).

At least one of (or all of as illustrated) the buses 30, 31, 32, 33 may be electrically connected to and provide electrical power to at least one hotel bus 40, 41 for providing the hotel loads. The buses 30, 31, 32, 33 may be electrically connected to the same at least one hotel bus 40, 41. Although not shown in FIG. 3, the hotel buses 40 connected to each bus 30, 31, 32, 33 may be the same or connected to each other and/or the hotel buses 41 connected to each bus 30, 31, 32, 33 may be the same or connected to each other). At least one of (or all of as illustrated) the buses 30, 31, 32, 33 may be selectively connectable to at least one hotel bus 40, 41 by one or more hotel switches 42, 43 and one or more hotel transformers 44, 45. The one or more hotel switches 42, 43 may be controlled by the control unit. The one or more hotel transformers 44, 45 may transform alternating current received from the buses 30, 31, 32, 33 into that required by the at least one hotel bus 40, 41. The at least one hotel bus 40, 41 may comprise first and second hotel buses 40, 41 at different voltages for meeting the differing requirements of the hotel loads. For example, a first hotel bus 40 may be at 440 V and 60 Hz whilst a second hotel bus 41 may be at 220 V and 60 Hz. The at least one hotel bus 40, 41 may provide electrical power to all of the hotel loads of the marine vessel 10 other than the propulsors 12, 13, 14, 15, 16.

The power distribution system 11 may comprise an auxiliary power system 46 electrically connected and providing electrical power to the auxiliary bus 30 for providing an auxiliary power supply to the power distribution system 11. The auxiliary power system 46 may comprise an auxiliary power unit 47, which may be operably connected to and supply mechanical power to an auxiliary generator 48. The auxiliary generator 48 may be configured to convert the mechanical power into electrical power and selectively supply electrical power to the auxiliary bus 30, such as via an auxiliary switch 49. The power distribution system 11 may comprise additional auxiliary power systems 46 attached to the auxiliary bus 30 for supplying electrical power thereto.

The power distribution system 11 comprises a first power generation system 50 electrically connected to the first bus 31 and operably connected to the first propulsor 12. The first power generation system 50 may selectively provide mechanical power to the first propulsor 12 and selectively supply electrical power to and/or selectively receive electrical power from the first bus 31. The power distribution system 11 comprises a second power generation system 60 electrically connected to the second bus 32 and operably connected to the second propulsor 14. The second power generation system 60 may be configured to provide power to the second propulsor 14 and supply electrical power to and/or receive electrical power from the second bus 32. The power distribution system 11 may comprise a third power generation system 70 electrically connected to the third bus 33 and operably connected to the third propulsor 13. The third power generation system 70 may be configured to provide power to the third propulsor 13 and supply electrical power to and/or receive electrical power from the third bus 33.

Each power generation system 50, 60, 70 may comprise any suitable means for mechanically driving the propulsors 12, 13, 14 and transferring electrical power with the buses 31, 32, 33. Each power generation system 50, 60, 70 may be an electromechanical system, such as a Power Take Off (PTO)/Power Take In (PTI) system or a variable drive system as disclosed in WO-A-2014/184517 or WO-A-2017/203198. However, as illustrated in FIG. 3, each power generation system 50, 60, 70 may comprise a power unit 51, 61, 71 operably connected to at least one transducer 52, 53, 62, 63, 72, 73, which may each be electrically connected to the corresponding bus 31, 32, 33. The at least one transducer 52, 53, 62, 63, 72, 73 may be selectively connectable to supply electrical power to or receive electrical power from the buses 31, 32, 33, such as via switches 55, 56, 65, 66, 75, 76. The switches 55, 56, 65, 66, 75, 76 may be controlled by the control unit.

Each of the first, second and third power generation systems 50, 60, 70 may comprise a first transducer 52, 62, 72 operably connected to the first, second or third propulsor 12, 14, 13 respectively and electrically connected to the first, second or third bus 31, 32, 33 respectively. The first transducer 52, 62, 72 may be electrically connected to the first, second or third bus 31, 32, 33 via a frequency converter 57, 67, 77 and a first switch 55, 65, 75. Each of the first, second and third power generation systems 50, 60, 70 may comprise a second transducer 53, 63, 73 electrically connected to the first, second or third bus 31, 32, 33 respectively, which may be via a second switch 56, 66, 76.

The power unit 51, 61, 71 of the first, second and third power generation systems 50, 60, 70 may be mechanically connectable to the first, second or third propulsor 12, 14, 13 respectively and/or the first transducer 52, 62, 72, which may be via a mechanical transmission 54, 64, 74, such that it can transmit power thereto only via a mechanical connection. For example, the first transducer 52, 62, 72 may comprise a rotating shaft receiving power from the mechanical transmission 54, 64, 74 and mechanically connected, for example via gears or the like, to a shaft driving a propeller of the corresponding propulsor 12, 14, 13. In order to selectively disconnect the power unit 51, 61, 71, mechanical transmission 54, 64, 74 and/or first transducer 52, 62, 72, one or more engageable clutches or the like may be located between them.

The at least one transducer 52, 53, 62, 63, 72, 73 may be a reversible electrical machine, such as an electrical motor and/or generator, and may be configured to convert electrical power into mechanical power for provision to the power unit 51, 61, 71 and/or mechanical transmission 54, 64, 74. The at least one transducer 52, 53, 62, 63, 72, 73 may be configured to convert mechanical power from the power unit 51, 61, 71 and/or mechanical transmission 54, 64, 74 into electrical power.

The power generation systems 50, 60, 70 may be operable in a similar manner to the propulsion system disclosed in WO-A-2014/184517 or WO-A-2017/203198. In particular, the mechanical transmission 54, 64, 74 may comprise a summation or planetary transmission. Each power generation system 50, 60, 70 may be operable such that the power unit 51, 61, 71 directly supplies mechanical power to the corresponding propulsor 12, 14, 13, which may be via the mechanical transmission 54, 64, 74 and, for example if connected to the same shaft, the first transducer 52, 62, 72. The power generation system 50, 60, 70 may be operable to supply electrical power from the power unit 51, 61, 71 to the corresponding bus 31, 32, 33, which may be via the first transducer 52, 62, 72 and first switch 55, 65, 75 or via the second transducer 53, 63, 73 and second switch 56, 66, 76. The second transducer 53, 63, 73 may convert the mechanical power from the power unit 51, 61, 71 into electrical power for provision to the corresponding bus 31. The power generation system 50, 60, 70 may be operable to supply electrical power from the corresponding bus 31, 32, 33 to the first transducer 52, 62, 72, which may be via the first switch 55, 65, 75 and frequency converter 57, 67, 77. The first transducer 52, 62, 72 may convert the electrical power into mechanical power for provision to the corresponding propulsor 12, 14, 13, which may be as an alternative or in addition (e.g. via the mechanical transmission 54) to the mechanical power derived directly and simultaneously from the power unit 51, 61, 71.

The power distribution system 11 may comprise at least one ancillary power system 80, 90 operably connected to at least one ancillary propulsor 15, 16. The at least one ancillary power system 80, 90 may be electrically connected to two of the first, second and third buses 31, 32, 33 for receiving electrical power therefrom and transferring the electrical power to drive the at least one ancillary propulsor 15, 16.

A first ancillary power system 80 may be electrically connected to the first and second buses 31, 32 and operably connected to the first ancillary propulsor 15. The first ancillary power system 80 may comprise at least one ancillary transducer 81, 82 electrically connected to, for receiving electrical power from, the first and second buses 31, 32 and operably connected to, for driving, the first ancillary propulsor 15. As illustrated, a first ancillary transducer 81 may be electrically connected to, for receiving electrical power from, the first bus 31 and a second ancillary transducer 82 may be electrically connected to, for receiving electrical power from, the second bus 32. The first and second ancillary transducer 81, 82 may be an electrical motor or a reversible electric machine and may be mounted to the same shaft for driving the first ancillary propulsor 15. The first ancillary power system 80 may comprise ancillary switches 83, 84 for enabling its selective connection with the first and second buses 31, 32. The first ancillary power system 80 may comprise at least one frequency converter 85, 86 for ensuring that the frequency of electrical power supplied to the at least one ancillary transducer 81, 82 matches its rated frequency. A first ancillary switch 83 and first ancillary frequency converter 85 may be located between the first ancillary transducer 81 and first bus 31. A second ancillary switch 84 and second ancillary frequency converter 86 may be located between the second ancillary transducer 82 and second bus 32.

A second ancillary power system 90 may be electrically connected to the second and third buses 32, 33 and operably connected to the second ancillary propulsor 16. The second ancillary power system 90 may comprise at least one ancillary transducer 91, 92 electrically connected to, for receiving electrical power from, the second and third buses 32, 33 and operably connected to, for driving, the second ancillary propulsor 16. As illustrated, a third ancillary transducer 91 may be electrically connected to, for receiving electrical power from, the second bus 32 and a fourth ancillary transducer 92 may be electrically connected to, for receiving electrical power from, the third bus 33. The third and fourth ancillary transducer 91, 92 may be an electrical motor or a reversible electric machine and may be mounted to the same shaft for driving the second ancillary propulsor 16. The second ancillary power system 90 may comprise ancillary switches 93, 94 for enabling its selective connection with the second and third buses 32, 33. The second ancillary power system 90 may comprise at least one frequency converter 95, 96 for ensuring that the frequency of electrical power supplied to the at least one ancillary transducer 91, 92 matches its rated frequency. A third ancillary switch 93 and third ancillary frequency converter 95 may be located between the third ancillary transducer 91 and second bus 32. A fourth ancillary switch 94 and fourth ancillary frequency converter 96 may be located between the fourth ancillary transducer 92 and third bus 33.

The auxiliary power unit 47 and power units 51, 61, 71 of the power generation systems 50, 60, 70 may each be an engine and/or turbine, for example an internal combustion engine (particularly a diesel engine) or a gas turbine. In a particular embodiment the power units 51, 61, 71 of the power generation systems 50, 60, 70 may have substantially the same construction and have substantially the same power outputs such that maintenance across the power units 51, 61, 71 is simplified. However, the mechanical transmission 64 of the second power generations system 60 may provide a lower power output, such as under half, to that of the power output of the mechanical transmission 54, 74 of the first and/or third power generation systems 50, 70. This is due to the lower power requirements of the second propulsor 14. Furthermore, the auxiliary power unit 47 may have a substantially smaller maximum power output than, such as under a half of, the maximum power output of the power units 51, 61, 71 of the power generation systems 50, 60, 70. The first transducers 52, 62, 72 and ancillary transducers 81, 82, 91, 92 may also have the same construction and have substantially the same rated power (e.g. approximately 0.5 MW) such that maintenance of the power distribution system 11 is simplified.

Power may be generated and distributed around the power distribution system 11 depending upon the power requirements of the at least one hotel bus 40, 41 and propulsors 12, 13, 14, 15, 16. The first and second buses 31, 32 are electrically connected to the auxiliary bus 30 such that electrical power is transferable between the first and second power generation systems 50, 60 for driving the first and/or second propulsors 12, 14 and may be for driving the first ancillary propulsor 15. The third bus 33 may be electrically connected to the auxiliary bus 30 such that electrical power is transferable between the first, second and/or third power generation systems 50, 60, 70 for driving the first, second and/or third propulsors 12, 13, 14 and/or the first and/or second ancillary propulsor 15, 16. The first ancillary power system 80 may be electrically connected to the first and second buses 31, 32 such that electrical power is transferable from the first and/or second bus 31, 32 to the first ancillary power system 80 for driving the first ancillary propulsor 15. The second ancillary power system 90 may be electrically connected to the second and third buses 32, 33 such that electrical power is transferable from the second and/or third bus 32, 33 to the second ancillary power system 90 for driving the first ancillary propulsor 15.

In a stationary mode the marine vessel 10 is stationary and is not propelled through a body of water (e.g. is in harbour or the like). Power may be generated and supplied only to at least one hotel bus 40, 41 and not to the propulsors 12, 13, 14, 15, 16. The control unit may operate only the auxiliary power system 46 to generate and supply electrical power to the auxiliary bus 30, such as by operating auxiliary power unit 47, closing auxiliary switch 49 and/or opening first, second and third bus switches 34, 35, 36. The at least one hotel bus 40, 41 may receive power directly from the auxiliary bus 30, such as by the control unit closing the corresponding at least one hotel switch 42, 43. Efficiency is improved as in the stationary mode the marine vessel 10 has low power requirements and the auxiliary power unit 47 is the smallest of the auxiliary power unit 47 and power units 51, 61, 71.

In a standby mode the marine vessel 10 may be stationary but ready for propulsion (e.g. is ready to leave harbour) or performing small manoeuvres (e.g. during docking at a harbour). Power may be generated and supplied to at least one hotel bus 40, 41 and, in the case of the marine vessel 10 performing small manoeuvres, to the propulsors 12, 13, 14, 15, 16. The control unit may operate only second power generation system 60 to generate and supply electrical power to the second bus 32, such as by operating the power unit 61, at least one transducer 63, 62 and at least one switch 65, 66 of the second power generation system 60 to generate electrical power and supply it to the second bus 32. As the power unit 61 of the second power generation system 60 may have a higher maximum power output than the auxiliary power unit 47, the power distribution system 11 may thus be prepared for the higher power requirements of propelling the marine vessel 10 in more significant manoeuvres by having the power unit 61 of the second power generation system 60 operational in standby mode.

In low, medium and high transit speed modes the marine vessel 10 may be propelled through a body of water. The marine vessel 10 may be operated in the stationary mode, subsequently in the standby mode, subsequently in the low transit speed mode, subsequently in the medium transit speed mode and subsequently in the high transit speed mode. Power may be generated and supplied to at least one hotel bus 40, 41 and at least one of the propulsors 12, 13, 14, 15, 16 (preferably at least one of the first, second and third propulsors 12, 13, 14).

In the low transit speed mode the marine vessel 10 may be propelled at up to a low speed threshold (e.g. approximately 10 knots or approximately 18.5 kph, although specific vessel speed will vary as a function of the Admiralty coefficient of the marine vessel 10). The control unit may operate only the second power generation system 60 and, optionally, the auxiliary power system 46 to generate and supply electrical power to the auxiliary and second buses 30, 32. The electrical power may be distributed to at least one of power generation systems 50, 60, 70 and ancillary power systems 80, 90 for driving at least one of the propulsors 12, 13, 14, 15, 16. The second power generation system 60 may also be operated to supply mechanical power to drive the second propulsor 14. Efficiency at low speeds is therefore improved as the power requirements of the marine vessel 10 are relatively low and the more efficient auxiliary power unit 47 is operated rather than the less efficient power units 51, 71 of the first and third power generation systems 50, 70.

In the medium transit speed mode the marine vessel 10 may be propelled at between the low speed threshold and a high speed threshold (e.g. approximately 14 knots or approximately 26 kph, although specific vessel speed will vary as a function of the Admiralty coefficient of the marine vessel 10). The control unit may operate only the first and third power generation systems 50, 70 such that their power units 51, 71 and mechanical transmissions 54, 74 supply mechanical power directly to the first and third propulsors 12, 13. The power units 51, 71 of the first and third power generation systems 50, 70 may be rated to be the most efficient when operating in the medium transit speed mode.

In the high transit speed mode the marine vessel 10 may be propelled above the high speed threshold. The control unit may operate the first and third power generation systems 50, 70 such that their power units 51, 71 and mechanical transmissions 54, 74 supply mechanical power directly to the first and third propulsors 12, 13. The second power generation system 60 may also supply mechanical power to the second propulsor 14 and/or may supply electrical power to the second bus 32 for distribution to the first and/or third bus 31, 33 via the auxiliary bus 30. The first and/or third power generation system 50, 70 may receive the electrical power from the first and/or third bus 31, 33 and, via the first transducers 52, 72 and/or mechanical transmissions 54, 74, supply yet further mechanical power to the first and third propulsors 12, 13. As a result, the maximum output of each of the power units 51, 61, 71 can be utilized to propel the marine vessel 10, the majority of which is via the high efficiency mechanical route.

In a low power dynamic positioning mode the marine vessel 10 is dynamically positioned to maintain a predetermined position on the body of water using an output power below a threshold power and may be implemented, for example, during dynamic positioning in calm waters. The control unit may operate only the second power generation system 60 and auxiliary power system 46 to generate and supply electrical power to the auxiliary and second buses 30, 32. The electrical power may be distributed to at least one of power generation systems 50, 60, 70 and ancillary power systems 80, 90 for driving at least one of the propulsors 12, 13, 14, 15, 16 via the transducers 52, 62, 72, 81, 82, 91, 92, depending upon the positioning requirements. Efficiency at low power requirements during dynamic positioning is therefore improved as the more efficient auxiliary power unit 47 is operated rather than the less efficient power units 51, 71 of the first and third power generation systems 50, 70.

In a high power dynamic positioning mode the marine vessel 10 is dynamically positioned to maintain a predetermined position on the body of water using an output power above the threshold power and may be implemented, for example, during dynamic position in rough waters. The high power dynamic positioning mode may be implemented subsequently to the low power dynamic positioning mode. The first, second and third power generation systems 50, 60, 70 and auxiliary power system 46 generate and supply electrical power to the auxiliary, first, second and third buses 30, 31, 32, 33. The electrical power may be distributed to at least one of power generation systems 50, 60, 70 and ancillary power systems 80, 90 for driving at least one of the propulsors 12, 13, 14, 15, 16 via the transducers 52, 62, 72, 81, 82, 91, 92, depending on the positioning requirements. Therefore, very high power can be provided during dynamic positioning if it is needed.

Various other embodiments also fall within the scope of the present disclosure. The marine vessel 10 may comprise further power generation systems 50, 60, 70 and ancillary power systems 80, 90 connected to further buses 31, 32, 33, each electrically connected to the auxiliary bus 30. The marine vessel 10 may not comprise the third propulsor 13, third power generation system 70 and third bus 33 and may instead comprise a single propulsor 12 towards the rear of the marine vessel 10 for propulsion in transit. Furthermore, the second propulsor 14 may perform the function of the third propulsor 13 as discussed above and may be located towards the rear of the marine vessel 10 instead or in addition.

INDUSTRIAL APPLICABILITY

The power distribution system 11 may have very high redundancy capabilities and it may be implemented in practice to meet the highest capability classification for dynamic position vessels, such as a DNV Environmental Regularity Number (ERN) of 99-99-99. However, the power distribution system 11 of the present disclosure is further differentiated over other marine vessels that achieve a DNV ERN 99-99-99 by the significantly lower installed power (i.e. total maximum power output of the power units 47, 51, 61, 71) it requires. For example, a typical comparable marine vessel achieving a DNV ERN 99-99-99 may require 10 MW of installed power to achieve such redundancy, whereas the power distribution system 11 of the present disclosure may only require 6.5 MW of installed power. This may be achieved due to the use of separate and selectively connectable auxiliary, first, second and third buses 30, 31, 32, 33. The result is that every propulsor 12, 13, 14, 15, 16 can receive power from two sources. Each propulsor 12, 13, 14 of each power generation system 50, 60, 70 can receive power either mechanically from the corresponding power unit 51, 61, 71 or electrically from the corresponding bus 31, 32, 33. Each ancillary propulsor 15, 16 can receive power from one of the two buses 31, 32, 33 to which it is connected. Therefore, no propulsor 12, 13, 14, 15, 16 is dependent upon receiving power from a single power source.

In particular, due to the separate auxiliary, first, second and third buses 30, 31, 32, 33 and ability of each power generation system 50, 60, 70 to mechanically power each propulsor 12, 13, 14, any failures can easily be isolated and the power distribution system 11 can still provide power to all propulsors 12, 13, 14, 15, 16. In the case of a failure the control unit may operate at least one of the switches 34, 35, 36, 42, 43, 49, 55, 56, 65, 66, 75, 76, 83, 84, 93, 94 to disconnect the failed component from the other components. The control unit may determine whether to isolate at least one of the first, second and/or third power generation system 50, 60, 70, the first and/or second ancillary power system 80, 90 and/or the auxiliary, first, second and/or third buses 30, 31, 32, 33 and subsequently isolate them from the rest of the power distribution system 11.

If there is a failure at the auxiliary bus 30, the power generation systems 50, 60, 70 can still provide power to every propulsor 12, 13, 14, 15, 16 and may be isolated. Isolating the auxiliary bus 30 from the first, second and/or third power generation system 50, 60, 70 may comprise disconnecting the first, second and/or third bus switch 34, 35, 36 and supplying electrical power to at least one hotel bus 40, 41 from the auxiliary bus 30. Therefore, for example, the high power dynamic positioning mode may still be implemented, with the only loss of power being the loss of the power generated by the auxiliary power system 46.

If there is a failure at the first, second or third bus 31, 32, 33, the first, second and/or third power generation systems 50, 60, 70 can be isolated. Isolating the first, second and/or third power generation system 50 may comprise disconnecting the corresponding first, second and/or third bus switch 34, 35, 36 and operating the first, second and/or third power generation system 50, 60, 70 to supply mechanical power to the corresponding first, second and/or third propulsor 12, 14, 13 and/or at least one hotel bus 40, 41. Isolating the first, second and/or third power generation system 50 from the first, second and/or third bus 31, 32, 33 may comprise disconnecting the corresponding first and/or second switches 55, 56, 65, 66, 75, 76. The first, second and/or third power generation systems 50, 60, 70 can therefore still provide mechanical power directly to the propulsors 12, 13, 14.

Furthermore, whilst at least one of the first, second and/or third power generation systems 50, 60, 70 and corresponding first, second and/or third bus 31, 32, 33 is operational, power can still be provided to ancillary power systems 80, 90 to drive the first and/or second ancillary propulsor 15, 16.

This is due to each ancillary power system 80, 90 being electrically connected to two of the first, second and third buses 31, 32, 33.

The first and third buses 31, 33 can each supply power to at least one propulsor 12, 13 located towards the rear of the vessel via the first and third power generation system 50, 70 and can each supply power to at least one ancillary propulsor 15, 16 located towards the bow 21 of the vessel via the first and second ancillary power system 80, 90. Therefore, in the event of failure of the second power generation system 60, the auxiliary bus 30 and one of the first or third power generation systems 50, 70, the power distribution system 11 can still provide propulsion at the bow 21 and stern 19 of the marine vessel 10. As a result, dynamic positioning is still possible even in the event of substantial failures.

Furthermore, since the at least one hotel bus 40, 41 may be connected to each of the auxiliary, first, second and third buses 30, 31, 32, 33, the required hotel loads can still be provided that just one of the auxiliary power system 46 and first, second and/or third power generation systems 50, 60, 70 is operational.

What is claimed is:

1. A power distribution system for a marine vessel comprising:
    auxiliary, first and second buses;
    first and second propulsors for propelling the marine vessel;
    a first power generation system electrically connected to the first bus and operably connected to the first propulsor; the first power generation system comprising:
    a power unit mechanically connected via a transmission to the first propulsor for supplying mechanical power to drive the first propulsor; and
    at least one transducer electrically connected to the first bus and operably connected to the first propulsor for supplying mechanical power to drive the first propulsor; and
    a second power generation system electrically connected to the second bus and operably connected to the second propulsor, the second power generation system providing a maximum power output less than or equal to half of a maximum power output of the first power generation system;
    wherein the first and second buses are electrically connected to the auxiliary bus such that electrical power is transferrable between the first and second power generation systems for driving the first and/or second propulsors.

2. A power distribution system as claimed in claim 1 wherein the auxiliary and first buses are electrically connected via a first bus switch and/or the auxiliary and second buses are electrically connected via a second bus switch.

3. A power distribution system as claimed in claim 1 wherein:
    the first power generation system comprises the power unit operably connected to the at least one transducer; and/or
    the second power generation system comprises a power unit operably connected to at least one transducer; and
    the at least one transducer of the second power generation system is electrically connected to the second bus and operably connected to the second propulsor.

4. A power distribution system as claimed in claim 3 wherein the first and/or second power generation system comprises a first and a second transducer, wherein:
    in the first power generation system the first transducer is electrically connected to the first bus and operably connected to the first propulsor, and the second transducer is electrically connected to the first bus; and/or
in the second power generation system, the first transducer is electrically connected to the second bus and operably connected to the second propulsor, and the second transducer is electrically connected to the second bus.

5. A power distribution system as claimed in claim 1 further comprising:
a first ancillary propulsor for propelling the marine vessel;
a first ancillary power system operably connected to the first ancillary propulsor and electrically connected to the first and second buses such that electrical power is transferrable from the first and/or second bus to the first ancillary power system for driving the first ancillary propulsor.

6. A power distribution system as claimed in claim 5 wherein the first ancillary power system comprises at least one ancillary transducer electrically connected to the first and second buses and operably connected to the first ancillary propulsor.

7. A power distribution system as claimed in claim 1 further comprising an auxiliary power system electrically connected to the auxiliary bus for providing electrical power to the first and/or second power generation systems via the first and/or second buses, the auxiliary power system providing a power output less than or equal to half of the maximum power output of the first power generation system.

8. A power distribution system as claimed in claim 1 wherein at least one of the auxiliary, first and second buses is electrically connected to at least one hotel bus.

9. A power distribution system as claimed in claim 1 further comprising:
a third bus;
a third propulsor for propelling the marine vessel; and
a third power generation system electrically connected to the third bus and operably connected to the third propulsor;
wherein the third bus is electrically connected to the auxiliary bus such that electrical power is transferrable between the first, second and/or third power generation systems for driving the first, second and/or third propulsors.

10. A power distribution system as claimed in claim 9 further comprising:
a second ancillary propulsor for propelling the marine vessel;
a second ancillary power system operably connected to the second ancillary propulsor and electrically connected to the second and third buses such that electrical power is transferrable from the second and/or third bus to the second ancillary power system for driving the second ancillary propulsor.

11. A method of operating a power distribution system for a marine vessel, the power distribution system comprising:
first and second buses electrically connected to an auxiliary bus;
first and second propulsors for propelling the marine vessel;
a first power generation system electrically connected to the first bus and operably connected to the first propulsor, the first power generation system comprising:
a power unit mechanically connected via a transmission to the first propulsor for supplying mechanical power to drive the first propulsor; and
at least one transducer electrically connected to the first bus for receiving electrical power from the first bus and operably connected to the first propulsor for supplying mechanical power to drive the first propulsor; and
a second power generation system electrically connected to the second bus and operably connected to the second propulsor, the second power generation system providing a maximum power output less than or equal to half of a maximum power output of the first power generation system;
wherein the method comprises:
operating the first and/or second power generation system to generate electrical power;
transferring the generated electrical power from the first and/or second power generation system to the second and/or first power generation system via the auxiliary, first and second buses; and
operating the second and/or first power generation system to receive the electrical power and supply mechanical power to drive the second and/or first propulsors.

12. A method as claimed in claim 11 further comprising operating a first bus switch to connect the first and auxiliary bus and/or operating a second bus switch to connect the second and auxiliary bus.

13. A method as claimed in claim 12 comprising operating a control unit to determine whether to isolate at least one of the first power generation system, second power generation system and auxiliary bus and subsequently isolate at least one of the first power generation system, second power generation system and auxiliary bus, wherein:
isolating the first power generation system comprises disconnecting the first bus switch and operating the first power generation system to supply mechanical power to the first propulsor and/or at least one hotel bus;
isolating the second power generation system comprises disconnecting the second bus switch and operating the second power generation system to supply mechanical power to the second propulsor and/or at least one hotel bus; and/or
isolating the auxiliary bus from the first and/or second power generation system comprises disconnecting the first and/or second bus switch and suppling electrical power to at least one hotel bus from the auxiliary bus.

14. A method as claimed in claim 11 wherein in the first power generation system the power unit supplies mechanical power to drive the first propulsor simultaneously to the at least one transducer receiving the electrical power from the first bus and supplying mechanical power to drive the first propulsor.

15. A method as claimed in claim 11 wherein in the second power generation system a power unit supplies mechanical power to drive the second propulsor simultaneously to at least one transducer receiving the electrical power from the second bus and supplying mechanical power to drive the second propulsor.

16. A method as claimed in claim 11 further comprising operating a first ancillary power system to receive electrical power from the first and/or second buses and supply mechanical power to drive a first ancillary propulsor for propelling the marine vessel.

17. A method as claimed in claim 11 further comprising:
operating the first power generation system only to generate electrical power;
operating the first power generation system to supply mechanical power to the first propulsor; and transferring the generated electrical power from the first power generation system via the first bus to operatively drive the second propulsors and/or a first ancillary propulsor.

18. A method as claimed in claim 11 further comprising:
operating the second power generation system only to generate electrical power;
operating the second power generation system to supply mechanical power to the second propulsor; and
transferring the generated electrical power from the second power generation system via the second bus to operatively drive the first propulsor and/or a first ancillary propulsor.

19. A method as claimed in claim 11, the power distribution system further comprising an auxiliary power system electrically connected to the auxiliary bus for providing electrical power to the first and/or second power generation systems via the first and/or second buses, the auxiliary power system providing a power output less than or equal to half of the first power generation system;
wherein the method further comprises:
operating the auxiliary power system and the second power generation system only to generate electrical power;
operating the second power generation system to supply mechanical power to the second propulsor; and
transferring the generated electrical power from the auxiliary power system and the second power generation system to operatively drive the first propulsor and/or a first ancillary propulsor.

20. A method as claimed in claim 11, the power distribution system further comprising an auxiliary power system electrically connected to the auxiliary bus for providing electrical power to the first and/or second power generation systems via the first and/or second buses, the auxiliary power system providing a power output less than or equal to half of the first power generation system;
wherein the method further comprises:
operating the auxiliary power system, the first power generation system, and the second power generation system to generate electrical power;
operating the first power generation system to supply mechanical power to the first propulsor;
operating the second power generation system to supply mechanical power to the second propulsor; and
transferring the generated electrical power from the auxiliary power system to operatively drive the first propulsor, the second propulsor, and/or a first ancillary propulsor.

* * * * *